(12) United States Patent
Lee

(10) Patent No.: US 12,511,312 B2
(45) Date of Patent: Dec. 30, 2025

(54) ELECTRONIC APPARATUS AND METHOD FOR MANAGING FEATURE INFORMATION

(71) Applicant: Hyperconnect LLC, Seoul (KR)

(72) Inventor: Young Soo Lee, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 0 days.

(21) Appl. No.: 18/463,980

(22) Filed: Sep. 8, 2023

(65) Prior Publication Data

US 2024/0086419 A1 Mar. 14, 2024

(30) Foreign Application Priority Data

Sep. 8, 2022 (KR) .......................... 10-2022-0114164
Aug. 10, 2023 (KR) .......................... 10-2023-0104771

(51) Int. Cl.
G06F 16/27 (2019.01)
G06F 16/22 (2019.01)

(52) U.S. Cl.
CPC ........ G06F 16/275 (2019.01); G06F 16/2291 (2019.01)

(58) Field of Classification Search
CPC ........................... G06F 16/275; G06F 16/2291
USPC ......................................................... 707/610
See application file for complete search history.

(56) References Cited

U.S. PATENT DOCUMENTS

| | | | |
|---|---|---|---|
| 10,713,769 B2 | 7/2020 | Zhang et al. | |
| 10,762,894 B2 | 9/2020 | Sainath et al. | |
| 10,949,951 B2 | 3/2021 | Tang et al. | |
| 11,062,725 B2 | 7/2021 | Variani et al. | |
| 11,443,134 B2 | 9/2022 | Ahn et al. | |
| 11,854,536 B2 | 12/2023 | Ahn et al. | |
| 2014/0156693 A1* | 6/2014 | Kritt | G06F 16/73 707/767 |

(Continued)

FOREIGN PATENT DOCUMENTS

| | | |
|---|---|---|
| KR | 20090015678 A | 2/2009 |
| KR | 20190007934 A | 1/2019 |

(Continued)

OTHER PUBLICATIONS

Amended Claims Application EP20193178.9 Filed After Receipt of European Search Report, Sep. 16, 2021, 6 pgs.

(Continued)

*Primary Examiner* — Amy Ng
*Assistant Examiner* — Antonio J Caiado
(74) *Attorney, Agent, or Firm* — Patent Capital Group

(57) ABSTRACT

Provided is an electronic apparatus and a method of managing feature information performed by the electronic apparatus, the method including the electronic apparatus receiving a request to store feature information in a database, based on at least some of a feature quantity, attributes of the feature information, a calculation method of the feature information and sources of the feature information, the electronic apparatus storing the feature information in one of a first database in which data for inference of a machine learning model is stored and a second database in which data for training the machine learning model is stored, and the electronic apparatus synchronizing the feature information from one of the first database and the second database in which the feature information is stored to the other database.

13 Claims, 7 Drawing Sheets

(56) References Cited

U.S. PATENT DOCUMENTS

| | | | | |
|---|---|---|---|---|
| 2015/0234618 | A1* | 8/2015 | Miwa | G06F 3/0617 |
| | | | | 711/165 |
| 2016/0307281 | A1* | 10/2016 | Canis | G06Q 10/025 |
| 2018/0068675 | A1 | 3/2018 | Variani et al. | |
| 2018/0181797 | A1* | 6/2018 | Han | G06V 40/161 |
| 2018/0204111 | A1 | 7/2018 | Zadeh et al. | |
| 2018/0260465 | A1* | 9/2018 | Hegde | G06F 16/282 |
| 2019/0286953 | A1 | 9/2019 | Farhadi et al. | |
| 2019/0341052 | A1 | 11/2019 | Allibhai | |
| 2019/0342174 | A1* | 11/2019 | Kaneko | H04L 41/0894 |
| 2020/0097818 | A1 | 3/2020 | Li et al. | |
| 2020/0210759 | A1 | 7/2020 | Chou et al. | |
| 2020/0285268 | A1* | 9/2020 | Meiri | G06F 1/12 |
| 2020/0410318 | A1 | 12/2020 | Del Mundo et al. | |
| 2021/0064920 | A1 | 3/2021 | Ahn et al. | |
| 2021/0074270 | A1 | 3/2021 | Ahn | |
| 2021/0089871 | A1 | 3/2021 | Han et al. | |
| 2021/0166106 | A1 | 6/2021 | Ghasemzadeh et al. | |
| 2021/0350254 | A1* | 11/2021 | Furlanetto | G06N 3/08 |
| 2022/0114172 | A1* | 4/2022 | Deshmukh | G06F 16/24568 |
| 2022/0207367 | A1 | 6/2022 | Ahn et al. | |
| 2022/0207368 | A1 | 6/2022 | Ahn et al. | |
| 2023/0030608 | A1* | 2/2023 | Furlanetto | G06N 5/04 |
| 2023/0135163 | A1 | 5/2023 | Morton et al. | |
| 2023/0162724 | A9 | 5/2023 | Ahn et al. | |
| 2023/0281457 | A1 | 9/2023 | Kye et al. | |
| 2023/0351224 | A1* | 11/2023 | Igure | G06N 5/04 |
| 2023/0409206 | A1* | 12/2023 | Kuchibhotla | G06F 3/0632 |
| 2024/0022535 | A1* | 1/2024 | Miller | H04L 51/52 |

FOREIGN PATENT DOCUMENTS

| | | |
|---|---|---|
| KR | 20210006502 A | 1/2021 |
| KR | 102229853 B1 | 3/2021 |

OTHER PUBLICATIONS

Amended Including Specification Application KR1020190106638 Korean Paten Office Jun. 28, 2021 (Year: 2021).

Extended European Search Report for European Application No. 23159854.1, Search completed Jun. 21, 2023, Mailed Jun. 30, 2023, 11 Pgs.

Extended European Search Report for European Patent Application No. 20193178.9, Dated Feb. 12, 2021, 12 Pgs.

Extended European Search Report for European Patent Application No. 21217866.9, Search completed May 23, 2022, Mailed Jun. 1, 2022, 10 pages.

Office Action for Korean Patent Application No. 10-2019-0106638, Dated Feb. 26, 2021, 10 Pgs.

Office Action issued in Korean Patent Application No. 10-2019-0130044, Dated Aug. 18, 2020, 8 Pgs.

"Gradient Estimation for Unseen Domain Risk Minimization with Pre-Trained Models", Under review as a conference paper at ICLR 2023, May 1, 2023.

"Tensorflow Profiler", Obtained from https://github.com/tensorflow/profiler/blob/master/README.md on Apr. 27, 2022, Last comment Nov. 7, 2020, 3 pages.

"TFLite Model Benchmark Tool.", 2018-2019, Printed Apr. 26, 2022, Retrieved from https://github.com/tensorflow/tensorflow/tree/r1.13/tensorflow/lite/tools/benchmark/, 8 pgs.

Abadi et al., "TensorFlow: a System for Large-scale Machine Learning", Proceedings of the12th USENIX Symposium on Operating Systems Design and Implementation (OSDI '16), Published online 2016, 20 pgs.

Alain et al., "Variance Reduction in SGD by Distributed Importance Sampling", arXiv preprint arXiv:1511.06481 (2015).

Andrade et al., "A Neural Attention Model for Speech Command Recognition", arXiv preprint arXiv:1808.08929, published online Aug. 27, 2018, 18 pgs.

Angluin, "Queries and Concept Learning", Machine learning 2(4), 1988, vol. 2, pp. 319-342, https://doi.org/10.1023/A:1022821128753.

Anonymous Authors, "Embedding Normalization: Significance Preserving Feature Normalization for Click-Through Rate Prediction", CIKM'21, Nov. 1-5, 2021, Online, 10 pgs., https://doi.org/10.1145/1122445.1122456.

Arazo et al., "Unsupervised Label Noise Modeling and Loss Correction", In: International conference on machine learning, Long Beach, California, PMLR 97, (2019), pp. 312-321. arXiv:1904.11238.

Arik et al., "Convolutional Recurrent Neural Networks for Small-footprint Keyword Spotting", Proceedings of the Annual Conference of the International Speech Communication Association (Interspeech), published online 2017, 5 pgs.

Arik et al., "Fast Spectrogram Inversion Using Multi-head Convolutional Neural Networks", arXiv preprint arXiv:1808.06719, published online Nov. 6, 2018, 6 pgs.

Arora et al., "A Convergence Analysis of Gradient Descent for Deep Linear Neural Networks", In: International Conference on Learning Representations (2018) arXiv:1810.02281v3.

Ash et al., "Deep Batch Active Learning by Diverse, Uncertain Gradient Lower Bounds", (2019), arXiv preprint arXiv:1906.03671.

Atlas et al., "Training Connectionist Networks with Queries and Selective Sampling", In: Advances in neural information processing systems. pp. 566-573. Citeseer (1990).

Beluch et al., "The Power of Ensembles for Active Learning in Image Classification", In: Proceedings of the IEEE Conference on Computer Vision and Pattern Recognition. (2018), pp. 9368-9377.

Cao et al., "Learning Imbalanced Datasets with Label-Distribution-Aware Margin Loss", Advances in Neural Information Processing Systems 32, 1567-1578 (2019), arXiv:1906.07413v2.

Chang et al., "Active Bias: Training More Accurate Neural Networks by Emphasizing High Variance Samples", Advances in Neural Information Processing Systems 30 (2017); arXiv:1704.07433v4.

Chen et al., "Small-footprint Keyword Spotting Using Deep Neural Networks", Proceedings of the IEEE International Conference on Acoustics, Speech and Signal Processing (ICASSP), https://doi.org/10.1109/ICASSP.2014.6854370, published online 2014, 5 pgs.

Choi et al., "Convolutional Recurrent Neural Networks for Music Classification", Proceedings of the IEEE International Conference on Acoustics, Speech and Signal Processing (ICASSP), published online Dec. 21, 2016, 5 pgs.

Choi et al., "Temporal Convolution for Real-Time Keyword Spotting on Mobile Devices", arXiv:1904.03814v1, Apr. 8, 2019, 5pgs.

Corbière et al., "Addressing Failure Prediction by Learning Model Confidence", Advances in Neural Information Processing Systems 32 (2019); arXiv:1910.04851v2.

Cowan et al., "Automating Generation of Low Precision Deep Learning Operators", arXiv:1810.11066v1 [cs.LG], Oct. 25, 2018, pp. 1-10.

Deng et al., "ImageNet: A Large-Scale Hierarchical Image Database", IEEE Conference on Computer Vision and Pattern Recognition, Jun. 20-25, 2009, pp. 248-255.

Gal et al., "Deep Bayesian Active Learning with Image Data", In: International Conference on Machine Learning. PMLR (2017), pp. 1183-1192.

Ganapathy et al., "3-D CNN Models for Far-Field Multi-Channel Speech Recognition", IEEE International Conference on Acoustics, Speech and Signal Processing (ICASSP), Calgary, AB, Canada, 2018, pp. 5499-5503, doi: 10.1109/ICASSP.2018.8461580.

Gissin et al., "Discriminative Active Learning", arXiv preprint arXiv:1907.06347 (2019).

Gopal, "Adaptive Sampling for SGD by Exploiting Side Information", In: International Conference on Machine Learning. 2016, PMLR 48: pp. 364-372.

He et al., "Deep Residual Learning for Image Recognition", in Proceedings of the IEEE Conference on Computer Vision and Pattern Recognition, 2016, pp. 770-778.

He et al., "Deep Residual Learning for Image Recognition", Proceedings of the IEEE/CVF Conference on Computer Vision and Pattern Recognition (CVPR), arXiv:1512.03385v1 [cs.CV], published online Dec. 10, 2015, pp. 1-12.

(56) References Cited

OTHER PUBLICATIONS

Hong et al., "Disentangling Label Distribution for Long-Tailed Visual Recognition", In: Proceedings of the IEEE/CVF Conference on Computer Vision and Pattern Recognition. (2021), pp. 6626-6636.
Horn et al., "The iNaturalist Species Classification and Detection Dataset", In: Proceedings of the IEEE conference on computer vision and pattern recognition. (2018), pp. 8769-8778; arXiv:707.06642v2.
Howard et al., "MobileNets: Efficient Convolutional Neural Networks for Mobile Vision Applications", arXiv preprint arXiv:1704.04861, published online Apr. 17, 2017, pp. 1-9.
Huang et al., "Normalization Techniques in Training DNNs: Methodology, Analysis and Application", arXiv:2009.12836, Sep. 27, 2020, 20 pages.
Huang et al., "On the Importance of Gradients for Detecting Distributional Shifts in the Wild", Advances in Neural Information Processing Systems 34 (2021); arXiv:2110.00218v2.
Ioffe et al., "Batch Normalization: Accelerating Deep Network Training by Reducing Internal Covariate Shift", Proceedings of the Internal Conference on Machine Learning (ICML), arXiv:1502.03167v3 [cs/LG] published online Mar. 2, 2015, pp. 1-11.
Jacot et al., "Neural Tangent Kernel: Convergence and Generalization in Neural Networks", Advances in neural information processing systems 31 (2018) arXiv:1806.07572v4.
Jiang et al., "MentorNet: Learning Data-Driven Curriculum for Very Deep Neural Networks on Corrupted Labels", In: International Conference on Machine Learning. PMLR (2018), pp. 2304-2313. arXiv:1712.05055v2.
Kao et al., "Sub-Band Convolutional Neural Networks for Small-Footprint Spoken Term Classification", arXiv:1907:01448v1, Jul. 2, 2019, 5 pgs.
Kawaguchi, "Deep Learning without Poor Local Minima", Advances in neural information processing systems 29 (2016); arXiv:1605.07110v3.
Kim et al., "Task-Aware Variational Adversarial Active Learning", In: Proceedings of the IEEE/CVF Conference on Computer Vision and Pattern Recognition. pp. 8166-8175 (2021).
Kingma et al., "Adam: A Method for Stochastic Optimization", In: International Conference on Learning Representations (ICLR) (2015); arXiv:1412.6980v9 [cs.LG], Jan. 30, 2017, 15 pgs.
Krizhevsky, "Learning Multiple Layers of Features from Tiny Images", Apr. 8, 2009.
Krizhevsky et al., "The CIFAR-10 Dataset", online: http://www.cs.toronto.edu/kriz/cifar.html 55(5) (2014).
Kye et al., "Learning Training Dynamics for Active Learning", arXiv:2210.06788v1 [cs.LG] Oct. 13, 2022.
Laine et al., "Temporal Ensembling for Semi-Supervised Learning", In: International Conference on Learning Representations (ICLR). (2017), vol. 4, p. 6; arXiv:1610.02242v3.
Lee et al., "Deep Neural Networks as Gaussian Processes", In: International Conference on Learning Representations (2018); arXiv:1711.00165v3.
Lewis et al., "A Sequential Algorithm for Training Text Classifiers", In: Proceedings of the 17th annual international ACM SIGIR conference on Research and development in information retrieval. pp. 3-12 (1994).
Li et al., "Visualizing the Loss Landscape of Neural Nets", Advances in neural information processing systems 31 (2018).
Liang et al., "FP-BNN: Binarized Neural Network on FPGA", Neurocomputing, Elsevier, 2018, vol. 275, pp. 1072-1086, Published Online Oct. 18, 2017.
Lim et al., "Rare Sound Event Detection Using 1D Convolutional Recurrent Neural Networks", Proceedings of the Detection and Classification of Acoustic Scenes and Events 2017 Workshop, Published online Nov. 16, 2017, 5 pgs.
Liu et al., "Large-Scale Long-Tailed Recognition in an Open World", In: Proceedings of the IEEE/CVF Conference on Computer Vision and Pattern Recognition. (2019), pp. 2537-2546; arXiv:1904.05160v2.
Loshchilov et al., "Online Batch Selection for Faster Training of Neural Networks", arXiv preprint arXiv:1511.06343 (2015).
Ma et al., "Shufflenet V2: Practical Guidelines for Efficient CNN Architecture Design", Proceedings of the European Conference on Computer Vision (ECCV), published online 2018, arXiv:1807.11164v1 [cs.CV], Jul. 30, 2018, 19 pgs.
Mittal, "A Survey of FPGA-based Accelerators for Convolutional Neural Networks", Neural Computing and Applications 2020, vol. 32, No. 4, published online Oct. 6, 2018, pp. 1109-1139, https://doi.org/10.1007/s00521-018-3761-1.
Netzer et al., "Reading Digits in Natural Images with Unsupervised Feature Learning", 2011.
Northcutt et al., "Confident Learning: Estimating Uncertainty in Dataset Labels", Journal of Artificial Intelligence Research 70, 1373-1411 (2021).
Pleiss et al., "Identifying Mislabeled Data using the Area Under the Margin Ranking", Advances in Neural Information Processing Systems 33, 17044-17056 (2020).
Prechlet, "Early Stopping—but When?", Neural Networks: Tricks of the trade, Springer, pp. 55-69, Published online 1998.
Ren et al., "A Survey of Deep Active Learning", ACM Computing Surveys (CSUR), (2021), 54(9), 1-40; arXiv:2009.00236v2.
Sainath et al., "Convolutional Neural Networks for Small-footprint Keyword Spotting", Proceedings of the Annual Conference of the International Speech Communication Association (Interspeech), published online 2015, pp. 1478-1482.
Sandler et al., "Mobilenetv2: Inverted Residuals and Linear Bottlenecks", Proceedings of the IEEE/CVF Conference on Computer Vision and Pattern Recognition (CVPR), published online 2018, pp. 4510-4520.
Sener et al., "Active Learning for Convolutional Neural Networks: a Core-Set Approach", ICLR 2018, 13 pgs, doi: 10.48550/arXiv.1708.00489.
Shannon, "A Mathematical Theory of Communication", The Bell System Technical Journal, July, Oct. 1948, vol. 27, 379-423, 623-656.
Shrivastava et al., "Training Region-based Object Detectors with Online Hard Example Mining", In: Proceedings of the IEEE conference on computer vision and pattern recognition. pp. 761-769 (2016).
Shui et al., "Deep Active Learning: Unified and Principled Method for Query and Training", In: International Conference on Artificial Intelligence and Statistics. PMLR (2020), pp. 1308-1318.
Sigtia et al., "Efficient Voice Trigger Detection for Low Resource Hardware", Proceedings of the Annual Conference of the International Speech Communication Association (Interspeech), https://www.iscaspeech.org/archive/Interspeech_2018/abstracts/2204.html, published online 2018, pp. 2092-2096.
Simons et al., "A Review of Binarized Neural Networks", Electronics, vol. 8, No. 661, Jun. 12, 2019, pp. 1-25, doi:10.3390/electronics8060661.
Sinha et al., "Variational Adversarial Active Learning.", In: Proceedings of the IEEE/CVF International Conference on Computer Vision. (2019), pp. 5972-5981; arXiv:1904.00370v3.
Song et al., "Selfie: Refurbishing Unclean Samples for Robust Deep Learning", In: International Conference on Machine Learning. 2019, PMLR 97, pp. 5907-5915.
Sun et al., "Compressed Time Delay Neural Network for Small-footprint Keyword Spotting", Proceedings of the Annual Conference of the International Speech Communication Association (Interspeech), published online 2017, 5 pgs.
Swayamdipta et al., "Dataset Cartography: Mapping and Diagnosing Datasets with Training Dynamics", In: Proceedings of the 2020 Conference on Empirical Methods in Natura Language Processing (EMNLP). Nov. 16-20, 2020, pp. 9275-9293.
Tan et al., "Mnas-net: Platform-aware Neural Architecture Search for Mobile", arXiv preprint arXiv:1807.11626, published online May 29, 2019, 9 pgs.
Tang et al., "Deep Residual Learning for Small-footprint Keyword Spotting", Proceedings of the IEEE International Conference on Acoustics, Speech and Signal Processing (ICASSP), arXiv:1710.10361v2 [cs.CL] Sep. 21, 2018, 5 pgs.

(56) References Cited

OTHER PUBLICATIONS

Toneva et al., "An Empirical Study of Example Forgetting during Deep Neural Network Learning", In: International Conference on Learning Representations (2018), Nov. 15, 2019; arXiv:1812.05159v3.

Tran et al., "Bayesian Generative Active Deep Learning", In: International Conference on Machine Learning. PMLR (2019); pp. 6295-6304. arXiv:1904.11643v1.

Tucker et al., "Model Compression Applied to Small-footprint Keyword Spotting", Proceedings of the Annual Conference of the International Speech Communication Association (Interspeech), published online 2016, pp. 1878-1882.

Umuroglu et al., "Work-in-Progress: Towards Efficient Quantized Neural Network Inference on Mobile Devices", 2017 International Conference on Compilers, Architectures and Synthesis for Embedded Systems, Oct. 15, 2017, 2 pgs., https://doi.org/10.1145/3125501.3125528.

Wang et al., "Correct Normalization Matters: Understanding the Effect of Normalization on Deep Neural Network Models for Click-Through Rate Prediction", Proceedings of 2020 Association for Computing Machinery, arXiv:2006.12753v2 [cs.LG] Jul. 7, 2020, 8 pgs., https://doi.org/10.1145/1122445.1122456.

Wang et al., "Small-footprint Keyword Spotting Using Deep Neural Network and Connectionist Temporal Classifier", arXiv preprint arXiv:1709.03665v1 [cs.CL] Sep. 12, 2017, 6 pgs.

Warden, "Launching the Speech Commands Dataset. [online]", https://ai.googleblog.com/2017/08/launching-speech-commands-dataset.html, published online Aug. 2017, 2 pgs.

Wei et al., "On the Margin Theory of Feedforward Neural Networks", Sep. 28, 2018.

Xiao et al., "Fashion-Mnist: a Novel Image Dataset for Benchmarking Machine Learning Algorithms", arXiv preprint arXiv:1708.07747v2 (2017).

Yi et al., "Embedding Normalization: Significance Preserving Feature Normalization for Click-Through Rate Prediction", 2021 International Conference on Data Mining Workshops (ICDMW), IEEE, Dec. 7, 2021, pp. 75-84, DOI 10.1109/ICDMW53433.2021.00016.

Yoo et al., "Learning Loss for Active Learning", In: Proceedings of the IEEE/CVF Conference on Computer Vision and Pattern Recognition. pp. 93-102 (2019); arXiv:1905.03677v1.

Zhang et al., "Cartography Active Learning", arXiv:2109.04282v1 [cs. CL] Sep. 9, 2021.

Zhang et al., "Hello Edge: Keyword Spotting on Microcontrollers", arXiv preprint arXiv:1711.07128 [vd/SD] Feb. 14, 2018, 14 pgs.

Zhang et al., "Imitating Deep Learning Dynamics Via Locally Elastic Stochastic Differential Equations", Advances in Neural Information Processing Systems 34 (2021); arXiv:2110.05960v1.

Zhao et al., "Stochastic Optimization with Importance Sampling for Regularized Loss Minimization", In: international conference on machine learning. pp. 1-9. PMLR (2015).

Zheng et al., "CowClip: Reducing CTR Prediction Model Training Time from 12 hours to 10 minutes on 1 GPU", arXiv:2204.06240v2, Apr. 22, 2022, 21 pages.

Zhou et al., "BBN: Bilateral-Branch Network with Cumulative Learning for Long-Tailed Visual Recognition", In: Proceedings of the IEEE/CVF Conference on Computer Vision and Pattern Recognition. pp. 9719-9728 (2020).

Zhou et al., "Curriculum Learning by Dynamic Instance Hardness", Advances in Neural Information Processing Systems 33, 8602-8613 (2020).

Zhu et al., "Generative Adversarial Active Learning", arXiv preprint arXiv:1702.07956 (2017).

\* cited by examiner

ELECTRONIC APPARATUS AND METHOD FOR MANAGING FEATURE INFORMATION

CROSS-REFERENCE TO RELATED APPLICATION(S)

This application claims the benefit of Korean Patent Application No. 10-2022-0114164, filed on Sep. 8, 2022, and Korean Patent Application No. 10-2023-0104771, filed on Aug. 10, 2023, in the Korean Intellectual Property Office, the disclosures of which are incorporated herein by reference.

BACKGROUND

1. Field of the Invention

Example embodiments relate to an electronic apparatus for managing feature information between different databases, and a method thereof.

2. Description of the Related Art

As online services become more advanced, the success or failure of the services depends on whether they can satisfy customers with detailed feature information. This tendency is getting stronger as AI-based machine learning models are applied to services. Representatively, recent services promote customer convenience by providing functions such as recommending products to customers or matching customers with other users by models trained using customer data, even if the customers do not request the functions.

At this time, in order to provide a satisfactory user experience to customers, a model with excellent performance should be used, and the performance of a model is affected by the amount and variety of data used for model training and inference. The problem is that in operating a database in which data for training a model is stored and a database in which data for inference is stored, the two databases are to be managed separately based on the difference in characteristics of the data stored in the two databases.

In particular, the main problem is to guarantee the consistency of data stored in the two databases, or to solve the inconvenience caused by separately implementing the logic that calculates the data to be stored in each of the two databases.

SUMMARY

An aspect of the invention provides an apparatus that synchronizes data between databases in which data with different characteristics are stored, and a method thereof.

Another aspect provides an apparatus that provides synchronized data to external entities in a centralized manner in response to data retrieval requests from the external entities, and provides a method thereof.

Additional feature information and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an embodiment of the invention, there is provided a method of managing feature information performed by an electronic apparatus, including receiving a request to store feature information in a database, based on at least some of a feature quantity indicating the amount of feature information in a set of feature information, attributes of the feature information, a calculation method of the feature information and sources of the feature information, storing the feature information in one of a first database in which data for inference of a machine learning model is stored and a second database in which data for training the machine learning model is stored, and synchronizing the feature information from one of the first database and the second database in which the feature information is stored to the other database.

According to an example embodiment, the storing the feature information may include storing the feature information in the first database, when the feature quantity is less than a predetermined number, when at least some of the attributes of the feature information correspond to attributes of data defined as being suitable for storage in the first database, or when the calculation method or the sources of the feature information correspond to a calculation method or sources defined as being suitable for storage in the first database, and storing the feature information in the second database, when the feature quantity is equal to or greater than the predetermined number, when at least some of the attributes of the feature information correspond to attributes of data defined as being suitable for storage in the second database, or when the calculation method or the sources of the feature information correspond to a calculation method or sources defined as being suitable for storage in the second database.

According to an example embodiment, the attributes of data defined as being suitable for storage in the first database may include at least some of an average conversation time per a first period of time of a user using a matching service, a number of other users with whom the user communicates using the matching service during the first period of time and a number of feedbacks the user enters in the matching service during the first period of time, and the attributes of data defined as being suitable for storage in the second database may include at least some of an average conversation time per a second period of time of the user using the matching service, a number of other users with whom the user communicates using the matching service during the second period of time and a number of feedbacks the user enters in the matching service during the second period of time, wherein the second period of time is longer than the first period of time.

According to an example embodiment, the calculation method defined as being suitable for storage in the first database may include calculating the feature information by processing data collected in a data messaging platform.

According to an example embodiment, the calculation method defined as being suitable for storage in the second database may include calculating the feature information by executing a query that processes data stored in a data storage.

According to an example embodiment, the synchronizing the feature information may include when the feature information is stored in the first database, transmitting copies of the feature information to the second database, and storing the transmitted copies of the feature information in the second database.

According to an example embodiment, the synchronizing the feature information may include when the feature information is stored in the second database, selecting at least some of the feature information based on the feature quantity, sizes of the feature information or attributes of the feature information, transmitting copies of the selected feature information to the first database, and storing the transmitted copies of the selected feature information in the first database.

According to an example embodiment, the synchronizing the feature information may include when the feature information is stored in the second database, transmitting copies of the feature information to the first database, and applying a time-to-live (TTL) option to at least some of the transmitted copies of the feature information and storing the copies in the first database.

According to an example embodiment, the method may further include, upon initial integration between the first database and the second database, automatically synchronizing at least some of the feature information stored in the second database to the first database.

According to an example embodiment, the method may further include receiving a search request for target feature information from an external node, based on at least some of a target feature quantity indicating the amount of feature information in a set of target feature information, sizes of the target feature information, attributes of the target feature information, latency information that is set in the search request and characteristics of the external node, determining a database to be referenced in response to the search request between the first database and the second database, and providing the external node with the target feature information among feature information stored in the determined database.

According to an example embodiment, the determining may include determining the first database as the database to be referred to, when the target feature quantity or the sizes of the target feature information are less than a predetermined number, when at least some of the attributes of the target feature information correspond to attributes of data for inference of the machine learning model, or when a latency limit value that is set in the search request is less than a predetermined value.

According to an example embodiment, the determining may include determining the second database as the database to be referred to, when the target feature quantity or the sizes of the target feature information are equal to or greater than a predetermined number, when at least some of the attributes among attributes of the target feature information correspond to attributes of data for training the machine learning model, or when a latency limit value that is set in the search request is not present or not less than a predetermined value.

According to an example embodiment, the providing may include, when the determined database is the first database, providing one or more log data related to the target feature information among feature information stored in the first database in addition to the target feature information.

According to an example embodiment, the one or more log data related to the target feature information may include log data in which at least some attribute values, among a plurality of attribute values constituting the log data, are identical to attribute values of the target feature information.

According to an example embodiment, the method may further include receiving an update request for a setting related to feature information from a user terminal through a version control system (VCS), querying an administrator terminal for approval of the update request, receiving an approval command for the update request from the administrator terminal, and updating settings related to feature information in response to the update request.

According to another aspect, there is provided an electronic apparatus of managing feature information, including a memory configured to store instructions and a processor, wherein the processor, connected to the memory, is configured to receive a request to store feature information in a database, based on at least some of a feature quantity, attributes of the feature information, a calculation method of the feature information and sources of the feature information, store the feature information in one of a first database in which data for inference of a machine learning model is stored and a second database in which data for training the machine learning model is stored, and synchronize the feature information from one of the first database and the second database in which the feature information is stored to the other database According to another aspect, there is provided a computer-readable recording medium having a program for executing a method, according to any one or more of the embodiments of the invention, performed by an electronic apparatus.

Additional aspects of example embodiments will be set forth in part in the description which follows and, in part, will be apparent from the description, or may be learned by practice of the disclosure.

According to example embodiments, synchronizing feature information between two databases in which feature information with different characteristics are stored through an electronic apparatus may alleviate the need to implement or change the data synchronization logic every time a new project or new feature information is generated, and thus development productivity may be improved.

Further, according to example embodiments, by synchronizing feature information centrally through an electronic apparatus, instead of directly accessing and storing the feature information in a database from external entities, the possibility of error occurrence may be reduced and data consistency may be improved.

Further, according to example embodiments, by synchronizing feature information centrally via an electronic apparatus, when a new technology for processing data is introduced, the new technology may be applied collectively to various projects.

Further, according to example embodiments, in addition to the feature information requested to be searched for the inference of a machine learning model, by further providing feature information related to the aforementioned feature information, historical information of the feature information may be reflected in the inference of the machine learning model, and thus inference performance regarding the machine learning model may be improved.

Effects of the present disclosure are not limited to those described above, and other effects may be made apparent to those skilled in the art from the following description.

BRIEF DESCRIPTION OF THE DRAWINGS

These and/or other aspects, feature information, and advantages of the invention will become apparent and more readily appreciated from the following description of example embodiments, taken in conjunction with the accompanying drawings of which.

DETAILED DESCRIPTION

Figure 1:
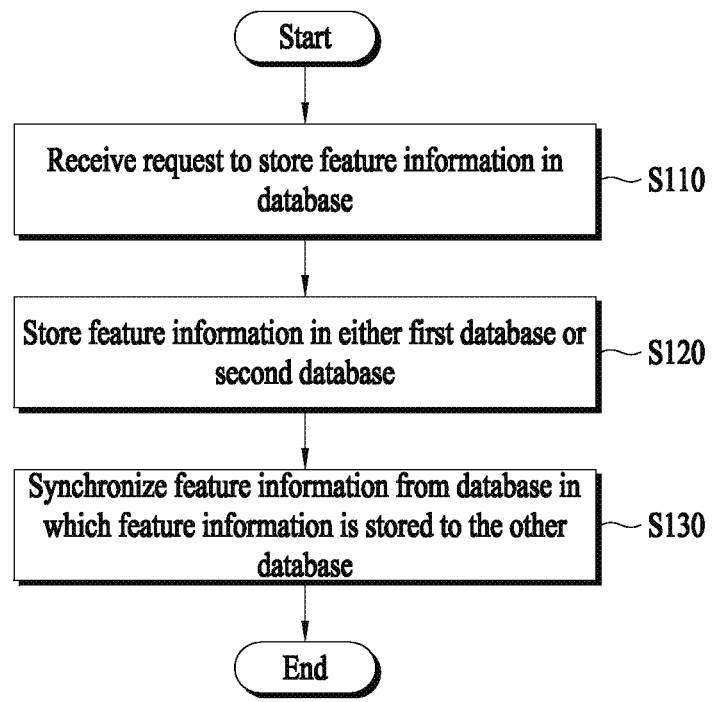
FIG. 1 is a flowchart of a method of managing feature information of an electronic apparatus according to an example embodiment.

Hereinafter, specific example embodiments are described with reference to the drawings. The following detailed description is provided for comprehensive understanding of the methods, apparatus, and/or systems described herein. However, the example embodiments are only for understanding and the present disclosure is not limited to the detailed description.

In describing the embodiments, when it is determined that a detailed description of the related known technology may unnecessarily obscure the gist of the disclosed embodiments, the detailed description will be omitted. In addition, the terms to be described later are terms defined in consideration of functions in the example embodiments of the present disclosure, which may vary according to intentions or customs of users and operators. Therefore, the definitions should be made based on the content throughout the present disclosure. The terms used in the detailed description are for the purpose of describing the embodiments only, and the terms should never be restrictive. Unless explicitly used otherwise, expressions in the singular include the meaning of the plural. In the present disclosure, expressions such as "include" or "comprise" are intended to refer to certain features, numbers, steps, acts, elements, some or a combination thereof, and the expressions should not be construed to exclude the presence or possibility of one or more other features, numbers, steps, acts, elements, or some or combinations thereof other than those described.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof. Unlike used in the illustrated embodiments, the terms may not be clearly distinguished in specific operations.

Expression "at least one of a, b and c" described throughout the specification may include "a alone," "b alone," "c alone," "a and b," "a and c," "b and c" or "all of a, b and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication device ensuring portability and mobility, and include (but is not limited to) any type of handheld wireless communication device, for example, a tablet PC, a smartphone, a communication-based terminal such as international mobile telecommunication (IMT), code division multiple access (CDMA), W-code division multiple access (W-CDMA), long term evolution (LTE), or the like.

In the following description, terms "transmission," "communication," "sending," "receiving" and other similar terms not only refer to direct transmission of a signal or information from one component to another component, but may also include transmission via another component.

In particular, to "transmit" or "send" a signal or information to an element may indicate a final destination of the signal or information, and may not imply a direction destination. The same is applied to in "receiving" a signal or information. In addition, in the present disclosure, when two or more pieces of data or information are "related," it indicates that when one piece of data (or information) is obtained, at least a part of the other data (or information) may be obtained based thereon.

Further, terms such as first and second may be used to describe various components, but the above components should be not limited by the above terms. The above terms may be used for the purpose of distinguishing one component from another component.

For example, without departing from the scope of the present disclosure, a first component may be referred to as a second component. Similarly, the second component may also be referred to as the first component.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so as to render the present disclosure complete, and completely inform the scope of the present disclosure to those of ordinary skill in the art to which the present disclosure pertains. The present disclosure is only defined by the scope of the claims. Like reference numerals refer to like elements throughout.

It will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein. Methods and systems illustrated in FIGS. 1 to 6 may be performed by, for example, an electronic apparatus 100 described with reference to FIG. 7. In other words, as an exemplary apparatus for managing feature information in the present disclosure, the electronic apparatus 100 may be a single apparatus, but according to an example embodiment, the electronic apparatus 100 may be a system composed of a plurality of detailed apparatuses that communicate with each other through a wired or wireless network.

FIG. 1 is a flowchart of a method of managing feature information of an electronic apparatus according to an example embodiment.

In operation S110, the electronic apparatus 100 may receive a request to store feature information in a database.

In the present disclosure, a "feature information" may indicate an attribute of data that can be used to sort or identify data. Specifically, a "feature information" may indicate one or more attribute (field) values constituting data stored in the database. The "feature information" may be already calculated at the time when data storage is requested, but according to an example embodiment, the feature information may be secondarily calculated using attribute values constituting the corresponding data before the data is actually stored in the database after data storage is requested.

In operation S120, based on at least some of the feature quantity (which may indicate the amount of feature information in a set of feature information), attributes, calculation methods and sources, the electronic apparatus 100 may store the feature information in either a first database in which data for inference of a machine learning model is stored or a second database in which data for training the machine learning model is stored.

Further, in the present disclosure, the "first database" may refer to a database used when providing data necessary for inference of a machine learning model, and the "second database" may refer to a database used when providing data necessary for training the machine learning model. The fact that the database is used may include all cases in which access to the database is made from an external entity.

For example, in some embodiments of the invention, the "first database" is a database in which feature information calculated using data generated in real time according to an event occurring in an online service is first stored, may be managed by My Structured Query Language (MySQL) and Not Only Structured Query Language (NoSQL), and may be a database in which access to a small number of records is made from an external entity and low latency is required. The first database may, for example, utilize one or more of various database systems, such as but not limited to MySQL when scalability is immaterial and strong schema is needed, MongoDB when useful schema and scalability are needed, Cassandra for ML applications with high write operations, and/or Redis for logic requiring fast response time. However, the "second database" may be a database in which feature information calculated using a large amount of data pre-stored in a data warehouse is first stored, may be a database in which multiple records are simultaneously accessed from external nodes, and may be a database requiring high throughput per query and low cost. The second database may, for example, be configured to consider column-oriented characteristics and utilize partitioning. In other words, the "first database" and the "second database" may differ in the number of stored feature information, attributes, calculation methods, sources, the number of access records from external entities and requirements.

In an example embodiment, when the feature quantity is less than a certain number, the electronic apparatus 100 may store the feature information in the first database, and when the feature quantity is equal to or greater than the certain number, the electronic apparatus 100 may store the feature information in the second database.

In another example embodiment, if at least some of the attributes of the feature information correspond to attributes of data defined as being suitable for storage in the first database, the electronic apparatus 100 may store the feature information in the first database, and if at least some of the attributes of the feature information correspond to attributes of data defined as being suitable for storage in the second database, the electronic apparatus 100 may store the feature information in the second database. For example, if a second period of time is longer than a first period of time, attributes of data defined as being suitable for storage in the first database may include at least some of average conversation time per first period of time of a user using the matching service, the number of other users with whom the user communicated using the matching service during the last first period of time, and the amount of feedback the user entered in the matching service during the last first period of time, and attributes of data defined as being suitable for being stored in the second database may include at least some of average conversation time per second period of time of the user using the matching service, the number of other users with whom the user communicated using the matching service during the last second period of time, and the amount of feedback the user entered in the matching service during the last second period of time. In other words, if the first period of time is a unit of hour and the second period of time is a unit of day, feature information including an average conversation time per hour as an attribute may be stored in the first database, and feature information including average conversation time per day as an attribute may be stored in the second database.

In another example embodiment, if the calculation methods or the sources of the feature information correspond to calculation methods or sources defined as being suitable for storage in the first database, the electronic apparatus 100 stores the feature information in the first database, and if the calculation methods or the sources of the feature information correspond to calculation methods or sources defined as being suitable for storage in the second database, the electronic apparatus 100 may store the feature information in the second database. For example, the calculation method defined as suitable for being stored in the first database may include a method of calculating feature information by processing data collected in the data messaging platform, and the calculation method defined as suitable for being stored in the second database may include a method of calculating feature information by executing a query processing data stored in a data warehouse.

In operation S130, between the first database and the second database, the electronic apparatus 100 may synchronize feature information from one in which feature information is stored to the other.

When the feature information is stored in the first database, by the electronic apparatus 100 transmitting copies of the feature information to the second database and storing the transmitted copies of the feature information in the second database, synchronization of the feature information from the first database to the second database may be performed.

According to an example embodiment, whenever feature information is stored in the first database, the electronic apparatus 100 may generate a copy of the feature information and transmit the copy to the second database. This is to ensure real-time data as much as possible. According to another example embodiment based on resources required for data transmission, when the feature quantity stored in the first database is equal to or greater than a certain number, the electronic apparatus 100 may collectively transmit copies of the feature information to the second database. According to another example embodiment, when a certain amount of time elapses after the transmission of the feature information from the first database to the second database, in the meantime, the electronic apparatus 100 may collectively transmit copies of the feature information stored in the first database to the second database.

Further, when the feature information is stored in the second database, by the electronic apparatus 100 transmitting copies of the feature information to the first database and storing the transmitted copies of the feature information in the first database, synchronization of the feature information from the second database to the first database may be performed. Here, in preparation for a case where the capacity of the first database is smaller than that of the second database, information to be stored in the first database may be selected in advance, or the lifespan of information to be stored in the first database may be set in advance. For example, based on the feature quantity, sizes, or attributes of the feature information stored in the second database, the electronic apparatus 100 may select at least some of the feature information stored in the second database, transmit copies of the selected feature information to the first database, and store the copies that are selected and transmitted in the first database. As another example, the electronic apparatus 100 transmits the copies of the feature information stored in the second database to the first database, and the electronic apparatus 100 may apply a time-to-live (TTL) option to at least some of the transmitted copies and store them in the first database. Through this, when the first database is in charge of storing data related to events occurring in the online service, as real-time properties are required for the first database, it is possible to prepare for the risk that the capacity of the first database is designed to be relatively small compared to the second database.

In an example embodiment, the electronic apparatus 100 may transmit a plurality of copies of the feature information stored in the second database to the first database in a data dump method. In this case as well, as described above, the electronic apparatus 100 may generate copies of the feature information whenever the feature information is stored in the second database and transmit the copies to the first database, the electronic apparatus 100 may collectively generate copies of a plurality of feature information stored in the second database and transmit the copies to the first database, or the electronic apparatus 100 may generate a copy each time feature information is stored in the second database but may transmit a plurality of copies to the first database in batches. Specifically, in an example embodiment in which a plurality of copies are collectively transmitted to the first database, the transmission of copies may be performed based on the number of copies exceeding a certain number, or the copies may be transmitted based on the elapse of a certain period of time.

As described in FIG. 1, data synchronization between the first database and the second database may be performed using a method such that when an external node transmits a request to the electronic apparatus 100, the electronic apparatus 100 processes the request and synchronizes data in the two databases instead of having an external node directly access each database. Due to this, compared to when an external node accesses each database directly, the probability of an error occurring in the synchronization process may be reduced. As a result, consistency of data may be more easily guaranteed. Further, since the data is centrally managed by the electronic apparatus 100, when a new technology (for example, data compression technology and technology for improving data transmission speed) for processing data is introduced, the effect of the new technology may be collectively enjoyed in various projects receiving data through communication with the electronic apparatus 100. In other words, the data synchronization function by the electronic apparatus 100 may function as a platform for various projects using synchronized data.

Figure 2:
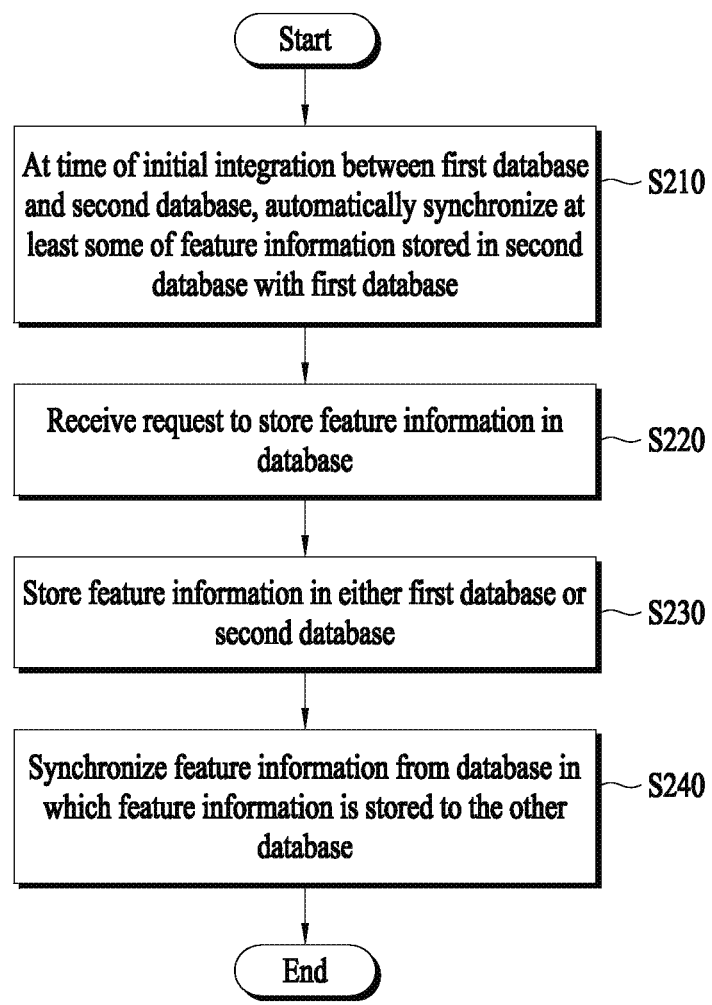
FIGS. 2 to 4 illustrate flowcharts of methods of managing feature information of an electronic apparatus according to additional example embodiments.
Figure 3:
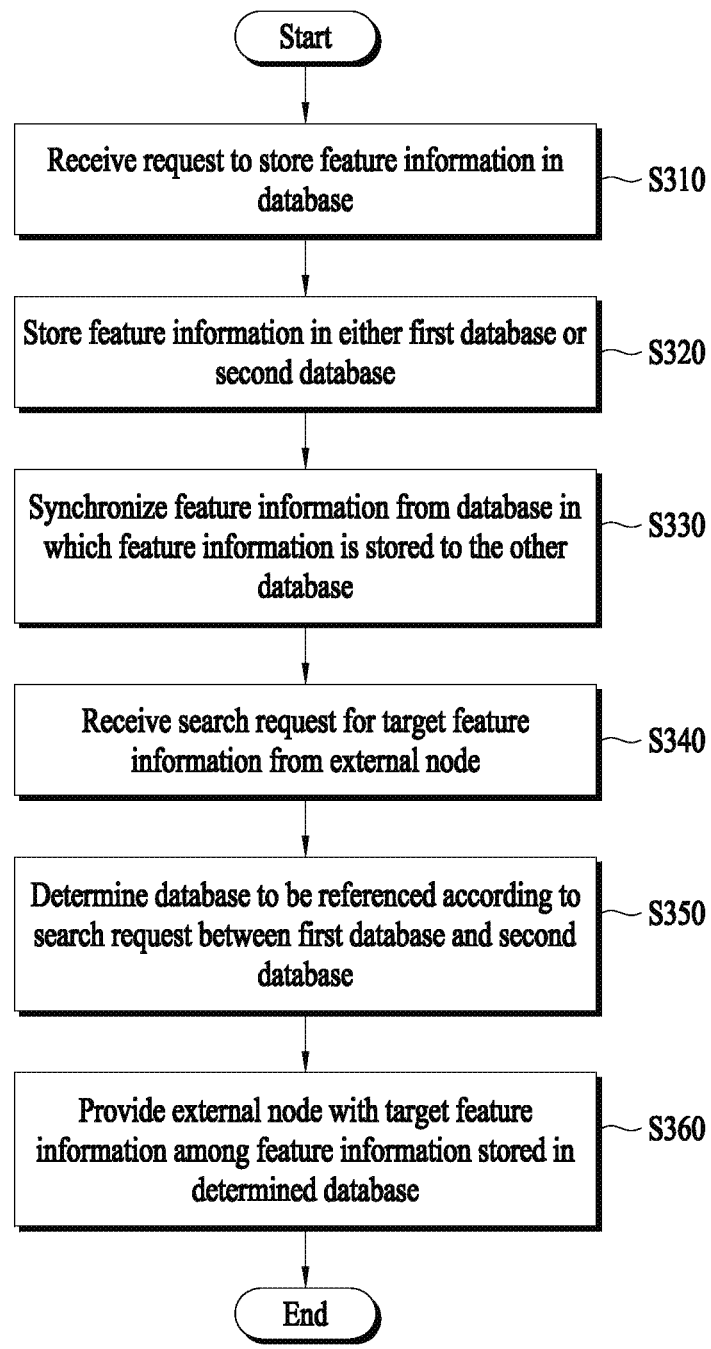
Figure 4:
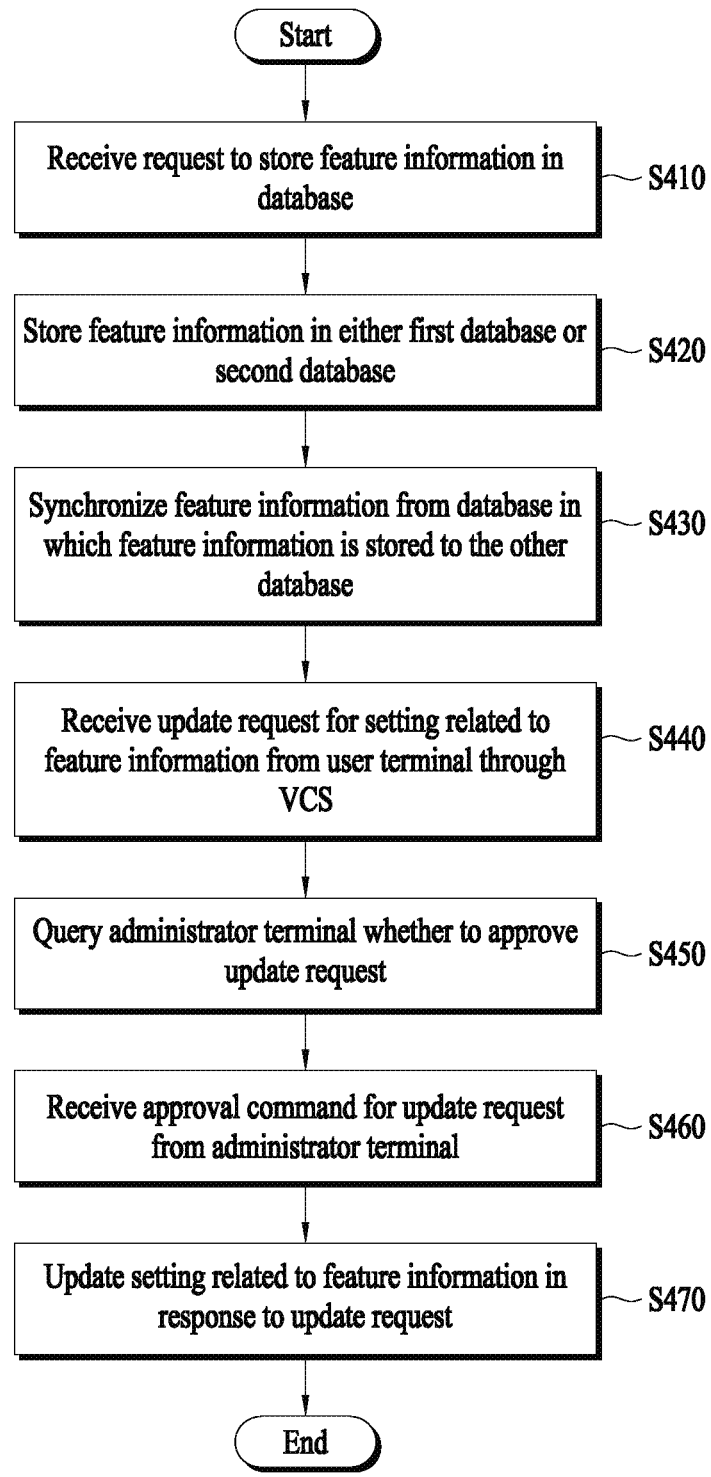

FIGS. 2 to 4 illustrate a flowchart of a method of managing feature information of an electronic apparatus according to additional example embodiments.

FIG. 2 is a flowchart of a method of managing feature information including a synchronization process at the time of initial integration of a first database and a second database.

In operation S210, at the time of initial integration between the first database and the second database, the electronic apparatus 100 may automatically synchronize at least some of the feature information stored in the second database with the first database. Through this, in an initial stage of integration between the databases, the electronic apparatus 100 may synchronize feature information calculated from data prior to integration on a large scale, and then, the electronic apparatus 100 may synchronize the feature information calculated from real-time or the latest data corresponding thereto in the post-integration operation. Accordingly, up-to-date or real-time data between the two databases may be achieved.

In operation S220, the electronic apparatus 100 may receive a request to store feature information in a database.

In operation S230, based on at least some of the feature quantity, attributes, a calculation method and sources, the electronic apparatus 100 may store the feature information in either the first database in which data for inference of a machine learning model is stored or the second database in which data for training the machine learning model is stored.

In operation S240, between the first database and the second database, the electronic apparatus 100 may synchronize the feature information from one in which the feature information is stored to the other.

FIG. 3 is a flowchart of processing a request for feature information from an external node prior to inference or training the machine learning model.

In operation S310, the electronic apparatus 100 may receive a request to store feature information in a database.

In operation S320, based on at least some of the feature quantity, attributes, a calculation method and sources, the electronic apparatus 100 may store the feature information in either the first database in which data for interference of the machine learning model is stored or the second database in which data for training the machine learning model is stored.

In operation S330, the electronic apparatus 100 may synchronize the feature information from one database in which the feature information is stored between the first database and the second database to the other database.

In operation S340, the electronic apparatus 100 may receive a search request for a target feature information from an external node.

In operation S350, based on at least some of the target feature quantity (which may indicate the amount of feature information in a set of target feature information), sizes, attributes, latency information that is set in the search request and characteristics of the external node, the electronic apparatus 100 may determine a database to be referenced according to the search request between the first database and the second database.

In an example embodiment, if the number or sizes of target feature information are less than a certain number, the electronic apparatus 100 may determine the first database as a database to be referred to, and if the number or sizes of the target feature information are equal to or greater than the certain number, the electronic apparatus 100 may determine the second database as a database to be referred to.

In another example embodiment, if at least some of the attributes of the target feature information correspond to attributes of the data for inference of the machine learning model, the electronic apparatus 100 may determine the first database as a database to be referred to, and if at least some of the attributes of the target feature information correspond to attributes of data for training the machine learning model, the electronic apparatus 100 may determine the second database as a database to be referred to.

In another example embodiment, if a latency value that is set for search request is less than a certain value, the electronic apparatus 100 may determine the first database as the database to be referred to, and if a latency limit value that is set in the search request does not exist or is equal to or greater than the certain value, the electronic apparatus 100 may determine the second database as the database to be referred to.

According to another example embodiment, if the external node is determined to be a server that operates to provide additional functions in an online service related to feature information, or if the external node is the relevant online service but is determined to be a server that operates to provide additional functions in related services already registered, the electronic apparatus 100 may determine the first database as a database to be referred to. For example, if the external node is determined to be a server operating to provide a user matching function that recommends other users to match with the current user in the online service or a ranking guide function that guides the current user's ranking in a specific field, the electronic apparatus 100 may determine the first database as a database to be referred to, since the first database may be suitable for providing feature information in a data streaming environment requiring low latency.

In another example embodiment, if the external node is determined to be a server constituting one element of a training pipeline for training and deploying the machine learning model, or if the external node is determined to be a server that communicates with the data store that is the target of query execution for feature information calculation, the electronic apparatus 100 may determine the second database as a database to be referred to. This is because the second database may be suitable for providing large-scale feature information, considering that large-scale data is required for training a model.

In operation S360, the electronic apparatus 100 may provide an external node with a target feature information among feature information stored in the database determined in operation S350.

In an example embodiment, if the database determined according to operation S350 is the first database, in addition to the target feature information, the electronic apparatus 100 may further provide one or more log data related to the target feature information among the feature information stored in the first database to be external node. Specifically, in addition to the target feature information requested from the external node, the electronic apparatus 100 may provide the external node with log data in which at least some of the attribute values constituting the log data are the same as those of the target feature information.

For example, in addition to the information about the conversation time of this month between the first user and the second user in the matching service, which is requested from the server operating to provide the user matching function, the electronic apparatus 100 may provide information about a conversation time between the first user and a third user or information about a conversation time between the first user and the second user in the last month. Accordingly, in inference of the machine learning model, historical information of the feature information may be referred to, and in particular, this may contribute to improving inference performance of transformer-based models such as BERT and GPT.

FIG. 4 is a flowchart of processing an update request from the outside in relation to feature information management.

In operation S410, the electronic apparatus 100 may receive a request for storing feature information in a database.

In operation S420, based on at least some of the feature quantity, attributes, calculation methods and sources, the electronic apparatus 100 may store the feature information in a first database in which data for inference of the machine learning model is stored or a second database in which data for training the machine learning model is stored.

In operation S430, between the first database and the second database, the electronic apparatus 100 may synchronize the feature information from one in which the feature information are stored to the other.

In operation S440, the electronic apparatus 100 may receive an update request for settings related to the feature information from the user terminal through the VCS. The VCS is a software that manages updates of documents or codes, and Git is a representative example.

In operation S450, the electronic apparatus 100 may query an administrator terminal whether to approve the update request.

In operation S460, the electronic apparatus 100 may receive an approval command for the update request from the administrator terminal.

In operation S470, the electronic apparatus 100 may update the settings related to the feature information in response to the update request.

In an example embodiment, the user terminal may transmit an update request through a method supported by the VCS (for example, a pull request), and upon receiving an approval command for the update request from the administrator terminal, the electronic apparatus 100 may update the calculation method or format of the feature information by merging the content of the update request into the master branch. Accordingly, the electronic apparatus 100 may receive an update request through the VCS without providing a separate web user interface or a separate application user interface.

The process described above with reference to FIG. 4 relates to a process of processing an update request from an arbitrary user terminal, and even though not illustrated, if there are restrictions on user terminals that can request update, the electronic apparatus 100 identifies whether the user terminal that transmitted the update request is a terminal to which update request authority is granted in operation S440, and the electronic apparatus 100 may perform subsequent operations only when the update request authority is present. Further, even though not illustrated, if the terminal that transmitted the update request is an administrator terminal, after operation S440, the electronic apparatus 100 may skip operations S450 and S460 and perform operation S470.

Figure 5:
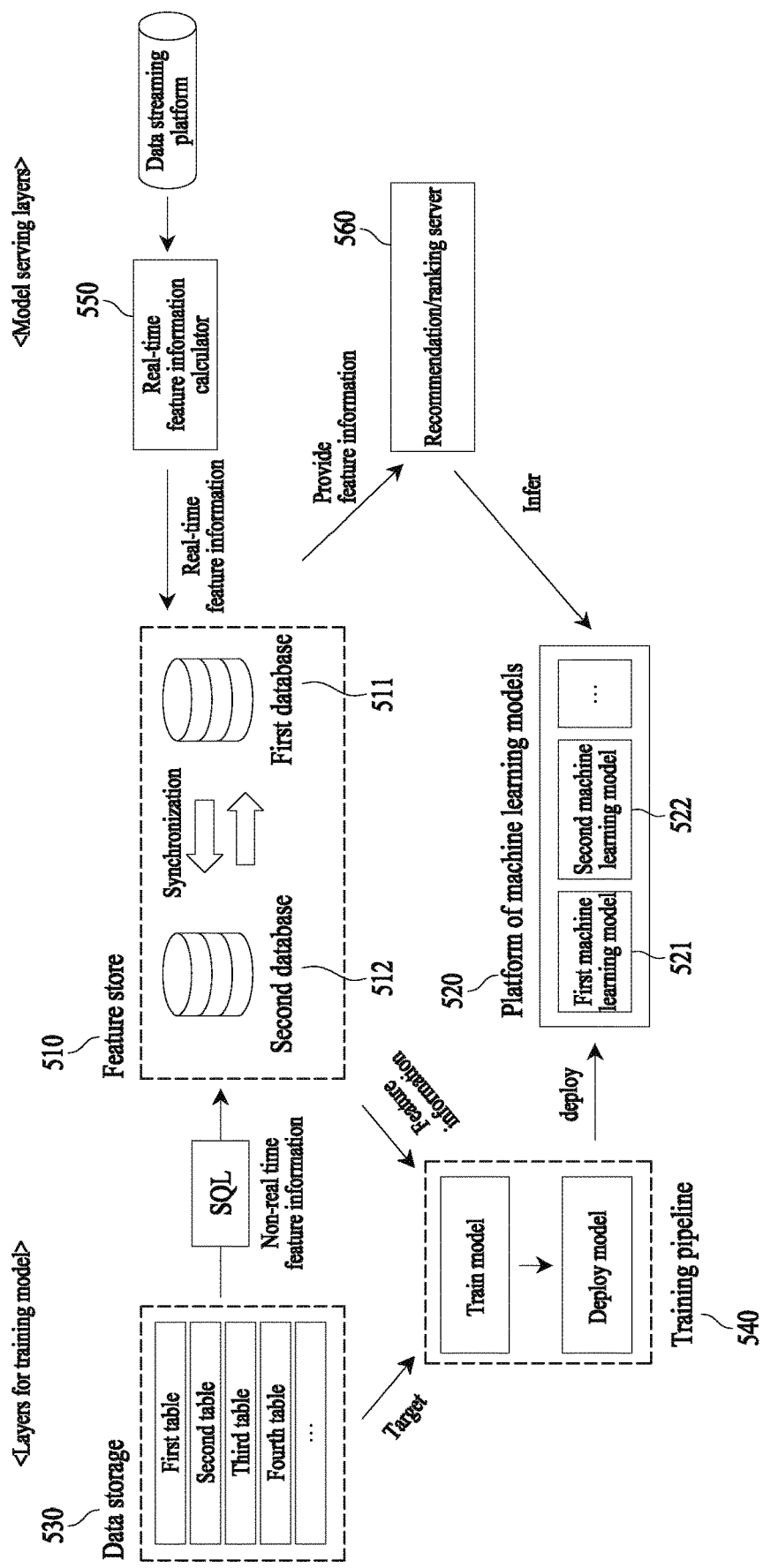
FIG. 5 is a diagram illustrating an architecture in which feature information is stored and managed according to an embodiment of the invention.

FIG. 5 is a diagram illustrating an architecture in which feature information is stored and managed. The electronic apparatus 100 may be an apparatus for driving a feature information store 510, which is a platform for synchronizing data between a first database 511 and a second database 512.

In order to introduce a machine learning model with excellent performance to an online service, various feature information must be used during training the model and in inference of the model, and thus the electronic apparatus 100 may provide feature information required for training the model and in the inference through a feature information store 510.

Referred to are layers for training the model of FIG. 5. Data stored in a data storage 530 may be generated by backing up logs of the online service. Further, data measured and calculated by various event times may be stored in the data storage 530 in the form of table records classified by attributes. The update period of each table may be arbitrarily set, but it may be basically set to be updated in non-real time (for example, daily update) rather than real time. If Structured Query Language (SQL) registered to process the data stored in the data storage 530 to generate desired feature information is executed at certain intervals, or when a certain condition is met, a storage request for non-real time feature information may be transmitted to the electronic apparatus 100. The electronic apparatus 100 may store the corresponding feature information in the second database 512 and further synchronize the corresponding feature information with the first database 511.

When feature information required for training a model is requested from a training pipeline 540 built for training the model, the electronic apparatus 100 may provide the requested feature information among feature information stored in the second database 512 to be used for the model training. As illustrated in FIG. 5, the data stored in the data storage 530 may also be used for training the model. After the model is trained, the trained model may be deployed to a platform 520 of machine learning models by the training pipeline 540. Various models may be applied to the online service, and thus there may be a plurality of subjects for training and inference such as a first machine learning model 521 and a second machine learning model 522.

Referred to are model serving layers of FIG. 5. Data collected according to an event occurring in the online service may be managed by a data messaging platform (for example, as illustrated in FIG. 5, a data streaming platform such as but not limited to Kafka). A real-time feature information calculator 550 may calculate feature information in real time by processing data collected by the data messaging platform. Accordingly, a storage request for feature information having real-time properties may be transmitted to the electronic apparatus 100. The electronic apparatus 100 may store corresponding feature information in the first database 511, and furthermore, the feature information may be synchronized with the second database 512.

When a server requiring result values of model inference (for example, a recommendation/ranking server 560) requests feature information necessary for model inference, the electronic apparatus 100 may provide the requested feature information among feature information stored in the first database 511 to be used for the model inference. This will be described in more detail with reference to FIG. 6.

Figure 6:
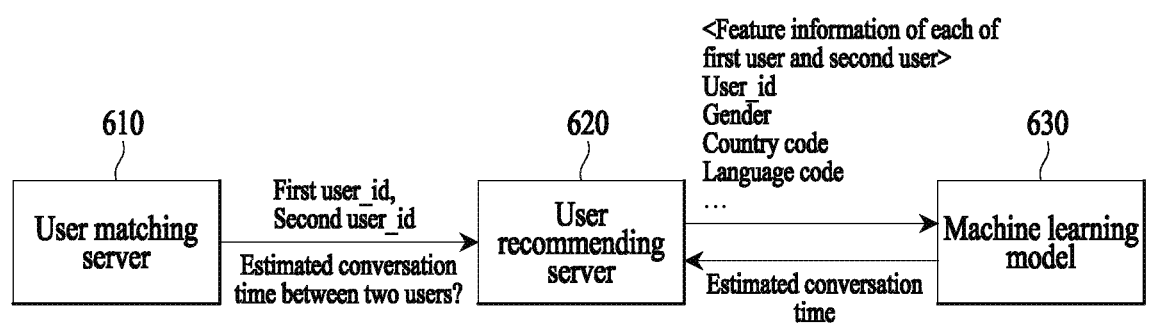
FIG. 6 is a diagram illustrating an example embodiment in which feature information is utilized for a matching service.

FIG. 6 is a diagram illustrating an example embodiment in which feature information are utilized for a matching service. In FIG. 6, a user matching server 610 and a user recommending server 620 are illustrated as separate servers, but this is for convenience of explanation, and the two servers may be implemented as one server according to an example embodiment. Meanwhile, the user recommending server 620 may correspond to a recommendation/ranking server such as that shown as element 560 in FIG. 5.

In a service that matches users on a one-to-one basis, an additional function of recommending a user who is expected to have the longest conversation time with a first user as a matching partner of the first user may be provided. For this function, the estimated conversation time between the first user and other users are to be identified, and thus the user matching server 610 may first query the user recommending server 620 for the estimated conversation time between the first user and a second user. In this case, the user matching server 610 will deliver only the first user's identification information (ID) and the second user's ID to the user recommending server 620, but since the user recommending server 620 is to infer the estimated conversation time of the first user and the second user using a machine learning model 630, various feature information for the first user and the second user are to be input to the machine learning model 630.

For example, as illustrated, in order to infer the estimated conversation time between the first user and the second user, ID, gender, country code and language code of each user may be required. For this, when the user recommending server 620 requests the electronic apparatus 100 to inquire about ID, gender, country code and language code of each of the first user and the second user, the electronic apparatus 100 may provide the user recommending server 620 with the requested feature information by referring to the first database 511. Then, when the machine learning model 630 outputs the estimated conversation time of the first user and the second user with the corresponding feature information as inputs, the user recommending server 620 transmits the estimated conversation time between the first user and the second user to the user matching server 610. After calculating estimated conversation time for the first user and a plurality of users, the user matching server 610 may recommend one or more users to the first user as matching partners. The first user may refer to this and use the matching service.

Figure 7:
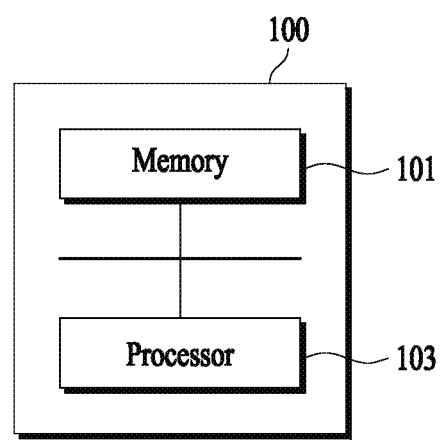
FIG. 7 is a block diagram of an electronic apparatus according to an example embodiment.

FIG. 7 is a block diagram of an electronic apparatus according to an example embodiment.

The electronic apparatus 100 may include a memory 101 and a processor 103 according to an example embodiment. According to an example embodiment, the electronic apparatus 100 may exchange data with the outside through an input/output interface.

The processor 103 may perform at least one method described above with respect to FIGS. 1 to 6. The memory 101 may store information for performing at least one method described above through FIGS. 1 to 6. The memory 101 may be volatile memory or non-volatile memory.

The processor 103 may control the electronic apparatus 100 to execute a program and provide information. Program codes executed by the processor 103 may be stored in the memory 101.

In an example embodiment, the processor 103 may be connected to the memory 101 and receive a request to store feature information in a database, based on the feature quantity, attributes, calculation methods and/or sources, the processor 103 may store the feature information in either a first database storing data for inference of the machine learning model or a second database storing data for learning the machine learning model, and the processor 103 may synchronize feature information from one of the first database and the second database where feature information are stored to the other database.

Further, the electronic apparatus 100 according to an example embodiment may include an interface that provides information to a user of the electronic apparatus 100.

In the electronic apparatus 100 illustrated in FIG. 7, only elements related to the present disclosure are illustrated. Therefore, those skilled in the art may understand that other general-purpose elements may be further included in addition to the elements illustrated in FIG. 7.

The electronic device according to the above-described example embodiments may include a processor, a memory for storing and executing program data, a permanent storage such as a disk drive, and/or a user interface device such as a communication port, a touch panel, a key and/or a button that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processor.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control devices. Similar to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

The above-described example embodiments are merely examples, and other embodiments may be implemented within the scope of the claims to be described later.

What is claimed is:

1. A method performed by an electronic apparatus, the method comprising:
   receiving a request to store feature information in a database;
   based on at least one of a feature quantity, attributes of the feature information, a calculation method of the feature information or sources of the feature information, storing the feature information in one of a first database in which data for inference of a machine learning model is stored and a second database in which data for training the machine learning model is stored;
   synchronizing the feature information from the first database to the second database, when the feature information is stored in the first database;
   synchronizing the feature information from the second database to the first database, when the feature information is stored in the second database;
   receiving a search request for target feature information from an external node;
   determining the first database as a database to be referred to, when a target feature quantity or sizes of the target feature information are less than a first predetermined number, when at least two attributes of the target feature information correspond to attributes of data for inference of the machine learning model, or when a latency limit value that is set in the search request is less than a predetermined value;
   determining the second database as the database to be referred to, when the target feature quantity or the sizes of the target feature information are equal to or greater than the first predetermined number, when at least two attributes of the target feature information correspond to attributes of data for training the machine learning model, or when the latency limit value that is set in the search request is not present or not less than the predetermined value;
   if the first database is the database to be referred to, providing the external node with the target feature information and one or more log data related to the target feature information among feature information stored in the first database, wherein the machine learning model performs the inference at least in part based on the data in the first database; and, if the second database is the database to be referred to, providing the external node with the target feature information among feature information stored in the second database.

2. The method of claim 1, wherein the storing the feature information includes:

storing the feature information in the first database, when the feature quantity is less than a second predetermined number, when at least two of the attributes of the feature information correspond to attributes of data defined as suitable for storage in the first database, or when the calculation method or the sources of the feature information correspond to a calculation method or sources defined as suitable for storage in the first database; and storing the feature information in the second database, when the feature quantity is equal to or greater than the second predetermined number, when at least two of the attributes of the feature information correspond to attributes of data defined as suitable for storage in the second database, or when the calculation method or the sources of the feature information correspond to a calculation method or sources defined as suitable for storage in the second database.

3. The method of claim 2, wherein the attributes of data defined as suitable for storage in the first database includes at least one of an average conversation time per a first period of time of a user using a matching service, a number of users with whom the user communicates using the matching service during the first period of time or an amount of feedback the user enters in the matching service during the first period of time, the attributes of data defined as suitable for storage in the second database includes at least one of an average conversation time per a second period of time of the user using the matching service, a number of users with whom the user communicates using the matching service during the second period of time or an amount of feedback the user enters in the matching service during the second period of time, and the second period of time is longer than the first period of time.

4. The method of claim 2, wherein the calculation method defined as suitable for storage in the first database includes calculating the feature information by processing data collected in a data messaging platform.

5. The method of claim 2, wherein the calculation method defined as suitable for storage in the second database includes calculating the feature information by executing a query that processes data stored in a data storage.

6. The method of claim 1, wherein the synchronizing the feature information from the first database includes:

transmitting copies of the feature information to the second database; and storing the transmitted copies of the feature information in the second database.

7. The method of claim 1, wherein the synchronizing the feature information from the second database includes:

selecting at least one of the feature information based on the feature quantity, sizes of the feature information or attributes of the feature information;

transmitting copies of the selected feature information to the first database; and storing the transmitted copies of the selected feature information in the first database.

8. The method of claim 1, wherein the synchronizing the feature information from the second database includes:

transmitting copies of the feature information to the first database; and applying a time-to-live (TTL) option to at least one of the transmitted copies of the feature information and storing the copies in the first database.

9. The method of claim 1, further comprising, upon initial integration between the first database and the second database, synchronizing at least a portion of the feature information stored in the second database to the first database.

10. The method of claim 1, wherein the one or more log data includes at least two attribute values that are identical to attribute values of the target feature information.

11. The method of claim 1, further comprising:

receiving an update request for a setting related to feature information from a user terminal through a version control system (VCS);

querying an administrator terminal for approval of the update request;

receiving an approval command for the update request from the administrator terminal; and updating settings related to feature information in response to the update request.

12. A non-transitory computer-readable recording medium having a program for executing the method according to claim 1.

13. An electronic apparatus, comprising:

a memory configured to store instructions; and a processor, wherein the processor, coupled with the memory, is configured to receive a request to store feature information in a database;

based on at least one of a feature quantity, attributes of the feature information, a calculation method of the feature information or sources of the feature information, store the feature information in one of a first database in which data for inference of a machine learning model is stored and a second database in which data for training the machine learning model is stored;

synchronize the feature information from the first database to the second database, when the feature information is stored in the first database;

synchronize the feature information from the second database to the first database, when the feature information is stored in the second database;

receive a search request for target feature information from an external node;

determine the first database as a database to be referred to, when a target feature quantity or sizes of the target feature information are less than a predetermined number, when at least two attributes of the target feature information correspond to attributes of data for inference of the machine learning model, or when a latency limit value that is set in the search request is less than a predetermined value;

determine the second database as the database to be referred to, when the target feature quantity or the sizes of the target feature information are equal to or greater than the predetermined number, when at least two attributes of the target feature information correspond to attributes of data for training the machine learning model, or when the latency limit value that is set in the search request is not present or not less than the predetermined value;

if the first database is the database to be referred to, provide the external node with the target feature information and one or more log data related to the target feature information among feature information stored in the first database, wherein the machine learning model performs the inference at least in part based on the data in the first database; and, if the second database is the database to be referred to, provide the external node with the target feature information among feature information stored in the second database.

\* \* \* \* \*